US012416400B1

(12) United States Patent
Pu et al.

(10) Patent No.: US 12,416,400 B1
(45) Date of Patent: Sep. 16, 2025

(54) LIGHTING EFFECT MODULE AND LIGHT

(71) Applicant: Luxshare Precision Industry Company Limited, Shenzhen (CN)

(72) Inventors: Yingbin Pu, Shenzhen (CN); Xiangpiao Yang, Shenzhen (CN)

(73) Assignee: Luxshare Precision Industry Company Limited, Shenzhen (CN)

( * ) Notice: Subject to any disclaimer, the term of this patent is extended or adjusted under 35 U.S.C. 154(b) by 0 days.

(21) Appl. No.: 18/768,638

(22) Filed: Jul. 10, 2024

(30) Foreign Application Priority Data

Apr. 17, 2024 (CN) ........................ 202410470610.1

(51) Int. Cl.
*F21V 23/06* (2006.01)
*F21V 21/002* (2006.01)
*F21V 23/00* (2015.01)

(52) U.S. Cl.
CPC ............ *F21V 23/06* (2013.01); *F21V 21/002* (2013.01); *F21V 23/005* (2013.01)

(58) Field of Classification Search
CPC ....... F21V 23/06; F21V 21/002; F21V 23/005
See application file for complete search history.

(56) References Cited

U.S. PATENT DOCUMENTS 5,797,767 A * 8/1998 Schell .................... H01R 12/79 439/490
7,494,244 B1 * 2/2009 Van Diep ............. F21V 19/001 439/502
9,528,661 B2 * 12/2016 Ferro ........................ F21K 9/90
2006/0262533 A1 * 11/2006 Lin ......................... F21V 29/70 362/294
2009/0196034 A1 * 8/2009 Gherardini ............ F21V 21/005 362/235
2015/0129014 A1 * 5/2015 Shu ......................... F24S 25/13 136/251
2018/0202636 A1 * 7/2018 Fox ....................... F21V 23/002

FOREIGN PATENT DOCUMENTS

CN 211289746 U 8/2020

* cited by examiner

*Primary Examiner* — Evan P Dzierzynski
(74) *Attorney, Agent, or Firm* — Birch, Stewart, Kolasch & Birch, LLP

(57) ABSTRACT

A lighting effect module includes a light module and a connection assembly. The light module includes a housing, a light cover, a female connector, a light-emitting body, and a circuit board. The light cover and the female connector are each disposed on the housing. The light-emitting body and the circuit board are each disposed in the housing. The light-emitting body and the female connector are electrically connected to the circuit board. The connection assembly includes an electrical connection module and an engaging module. The electrical connection module is configured to be plugged in and cooperate with female connectors of two light modules. The engaging module is configured to engage with housings of the two light modules to enable the two light modules to be electrically connected and engaged through the connection assembly.

16 Claims, 9 Drawing Sheets

LIGHTING EFFECT MODULE AND LIGHT

CROSS-REFERENCE TO RELATED APPLICATION(S)

This application claims the priority to Chinese Patent Application No. CN202410470610.1, filed on Apr. 17, 2024, the disclosure of which is incorporated herein by reference in its entirety.

TECHNICAL FIELD

The present application relates to the technical field of lights, in particular, a lighting effect module and a light.

BACKGROUND

Electronic devices such as business machines, servers, and audio are all equipped with light groups. The light groups may be indicator lights and ambient lights. The light groups may be installed on the front panel, side panel, and inside of the electronic devices. The installation position and installation quantity may be set according to the actual requirements of consumers.

In the related art, light groups include multiple light modules connected in series. To improve the aesthetics of light groups, light modules are connected by magnetic attraction, and two adjacent light modules are connected by a connector. Since a magnet needs to be disposed in each light module, the overall size of the light module is relatively large and takes up a larger space. Light modules may also be connected to each other by the plugging of male connectors and female connectors. However, the connection between light modules completely depends on the fixedness of the male connectors, and since the male connectors bear the force caused by the up, down, left, and right shaking between modules for a long time, the connection between the male connectors and the female connectors fails. Thus, signal transmission is affected, and reliability is lowered.

Therefore, a light module and a light are urgently needed to resolve the preceding problem.

SUMMARY

One object of the present application is to provide a lighting effect module. The lighting effect module, with relatively high connection reliability, reduces the probability of connection failure and ensures the stability of signal transmission.

As conceived above, the present application provides the solutions below.

A lighting effect module includes a light module and a connection assembly.

The light module includes a housing, a light cover, a female connector, a light-emitting body, and a circuit board. The light cover and the female connector are each disposed on the housing. The light-emitting body and the circuit board are each disposed in the housing. The light-emitting body and the female connector are electrically connected to the circuit board.

The connection assembly includes an electrical connection module and an engaging module. The electrical connection module is configured to be plugged in and cooperate with female connectors of two light modules. The engaging module is configured to engage with the housings of the two light modules to enable the two light modules to be electrically connected and engaged through the connection assembly.

Optionally, the engaging module includes a connection block and multiple first engaging pieces disposed on two sides of the connection block, the housing is provided with an engaging hole, and a first engaging piece of the multiple first engaging pieces disposed at one side of the connection block is configured to engage and cooperate with the engaging hole.

Optionally, the multiple first engaging pieces are disposed on the opposite sides of the connection block.

Optionally, a shallow groove is disposed on the housing and is configured to limit the connection block.

Optionally, the electrical connection module includes two male connectors that are disposed on the engaging module and electrically connected to each other, and a male connector is configured to be plugged in and cooperate with the female connector.

Optionally, the female connector includes a seat body and a conductive terminal.

The seat body is formed with a slot, a first plug hole, and an auxiliary slot. The first plug hole separately communicates with the slot and the auxiliary slot.

The conductive terminal includes a terminal body and a limiting structure. The terminal body is inserted through the first plug hole. One end of the terminal body has a contact portion disposed in the slot. The electrical connection module is configured to be plugged into the slot and electrically connected to the contact portion. Another end of the terminal body is connected to the limiting structure limited in the auxiliary slot. The conductive terminal is electrically connected to the circuit board.

Optionally, the female connector also includes an engaging holder, the seat body is further formed with a second plug hole, and the electrical connection module is formed with a clamping groove, where one end of the engaging holder is configured to be limited in the second plug hole and another end of the engaging holder is configured to engage and cooperate with the clamping groove.

Optionally, a second engaging piece is disposed on the female connector and is configured to engage and cooperate with the circuit board.

Optionally, the cross section of the housing is quadrilateral, and each of at least one sidewall of the housing is provided with the female connector.

Another object of the present application is to provide a light. The light, with relatively high flexibility and connection reliability, reduces the probability of connection failure.

As conceived above, the present application provides the solutions below.

A light includes the preceding lighting effect module.

Multiple light modules and multiple connection assemblies are provided. Two light modules are electrically connected and engaged through a connection assembly.

The beneficial effects of the present application are described below.

In the lighting effect module and the light provided by the present application, a female connector is disposed on the housing of a light module, and an electrical connection module of the connection assembly is configured to be plugged in and cooperate with the female connector to implement the electrical connection between two light modules that need to be spliced; the connection assembly also includes an engaging module configured to engage with the housings of two light modules so that the two light modules can also be engaged through the connection assembly, and magnets are not required to be installed in the light modules, thereby making the overall size of the light modules smaller. The configuration of the engaging module enables the connection between light modules to be achieved simultaneously by the electrical connection module and the engaging module, reduces the force borne by the electrical connection module, and thus reduces the probability of failure of the electrical connection module and the female connector being plugged. Moreover, the stability of signal transmission is ensured, enabling the lighting effect module to have higher reliability.

REFERENCE LIST

Figure 1:
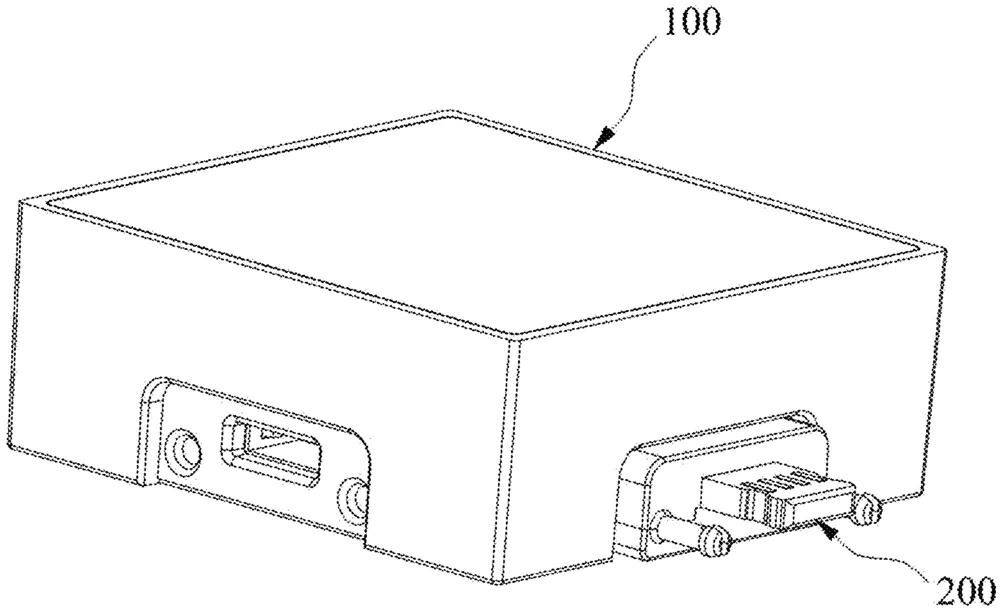
FIG. 1 is a view one illustrating the structure of a light module according to an embodiment of the present application.

100 light module
110 housing
111 engaging hole
1111 small hole section
1112 large hole section
112 shallow groove
113 through hole
120 light cover
130 female connector
131 seat body
1311 slot
1312 first plug hole
1313 auxiliary slot
1314 second plug hole
1315 receiving slot
132 conductive terminal
1321 terminal body
13211 contact portion
13212 buffer groove
1322 limiting structure
133 engaging holder
1331 engaging protrusion
140 light-emitting body
150 circuit board
160 second engaging piece
200 connection assembly
210 electrical connection module
211 male connector
212 clamping groove
220 engaging module
221 connection block
222 first engaging piece
2221 block
X first direction
Z second direction
Y third direction

DETAILED DESCRIPTION

To make problems to be solved, adopted solutions, and achieved effects of the present application clearer, solutions of the present application are further described below through embodiments in conjunction with drawings. It is to be understood that the embodiments described herein are intended to explain the present application and not to limit the present application. In addition, it should be noted that for ease of description, only the part, instead of all, related to the present application is illustrated in the drawings.

It is to be noted that similar reference numerals and letters indicate similar items in subsequent drawings. Therefore, once a certain item is defined in one drawing, the item needs no more definition and explanation in the subsequent drawings.

In the description of the present application, unless otherwise expressly specified and limited, the term "connected to each other", "connected", or "secured" is to be construed in a broad sense, for example, as securely connected, detachably connected, or integrated; mechanically connected or electrically connected; directly connected to each other or indirectly connected to each other via an intermediary; or internally connected between two components or interaction relations between two components. For those of ordinary skill in the art, specific meanings of the preceding terms in the present application may be construed based on specific situations.

In the present application, unless otherwise expressly specified and limited, when a first feature is described as "above" or "below" a second feature, the first feature and the second feature may be in direct contact or be in contact via another feature between the two features. Moreover, when the first feature is "on", "above", or "over" the second feature, the first feature is right on, above, or over the second feature, or the first feature is obliquely on, above, or over the second feature, or the first feature is simply at a higher level than the second feature. When the first feature is "under", "below", or "underneath" the second feature, the first feature is right under, below, or underneath the second feature, or the first feature is obliquely under, below, or underneath the second feature, or the first feature is simply at a lower level than the second feature. In the description of the embodiments, unless otherwise specified, "multiple" mentioned herein means two or more.

In the description of the embodiments, the orientation or position relationships indicated by terms "above", "below", "right", and the like are based on the orientation or position relationships shown in the drawings, only for ease of description and simplifying an operation, and these relationships do not indicate or imply that the referred device or element has a specific orientation and is constructed and operated in a specific orientation, and thus it is not to be construed as limiting the present application. In addition, terms "first" and "second" are used only to distinguish between descriptions and have no special meaning.

The embodiment provides a lighting effect module, with relatively high connection reliability, reduces the probability of connection failure and ensures the stability of signal transmission.

As shown in FIG. 1, a lighting effect module includes a light module 100 and a connection assembly 200, and the connection assembly 200 is electrically connected to and engaged with the light module 100 to implement the electrical connection and engaging between two light modules 100.

Figure 2:
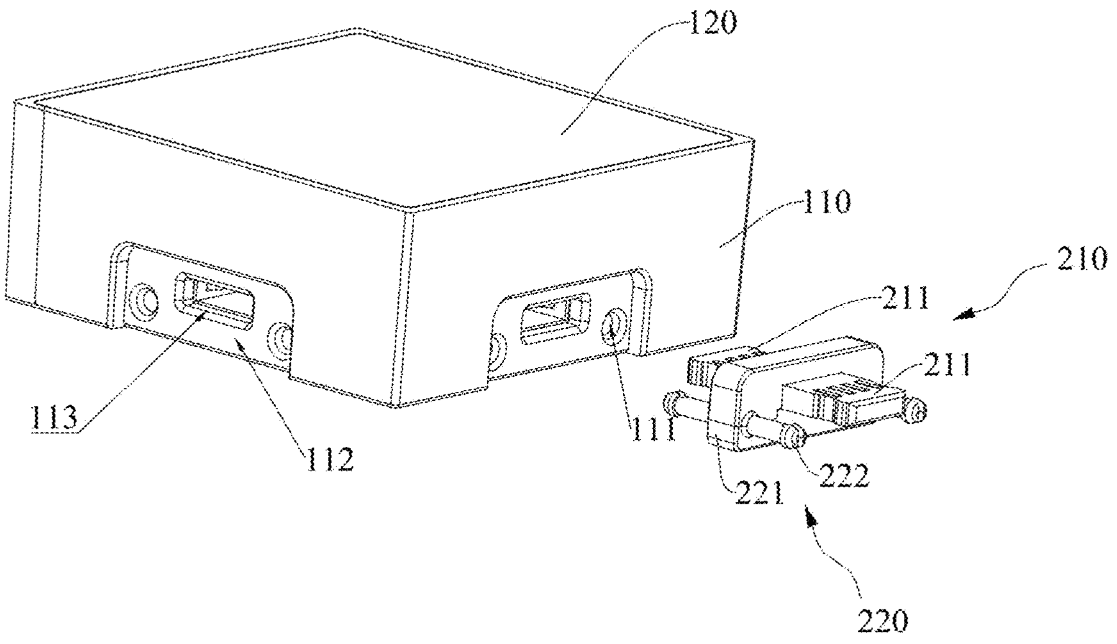
FIG. 2 is an exploded view one illustrating the structure of a light module according to an embodiment of the present application.
Figure 3:
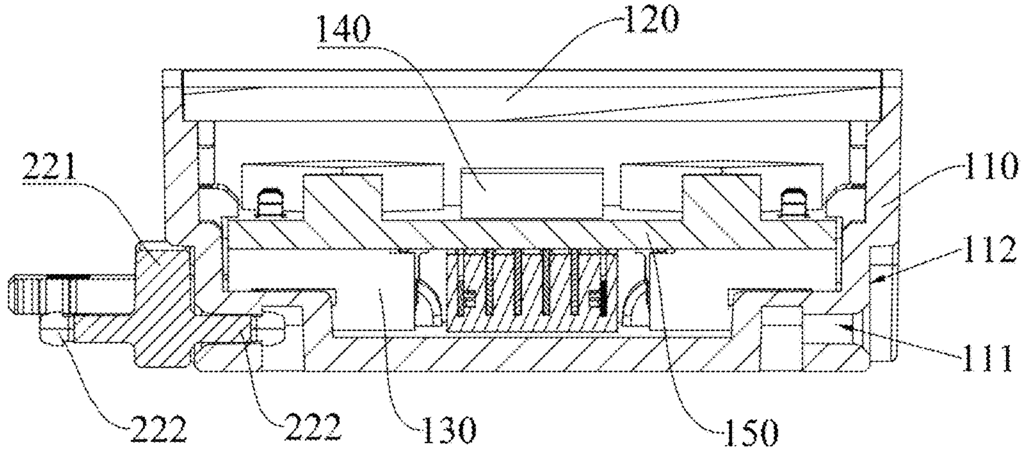
FIG. 3 is a sectional view one of a light module according to an embodiment of the present application.

As shown in FIG. 2 and FIG. 3, the light module 100 includes a housing 110, a light cover 120 disposed on the housing 110, a female connector 130 disposed on the housing 110, and a light-emitting body 140 and a circuit board 150 that are both disposed in the housing 110. The female connector 130 is electrically connected to the circuit board 150 to transmit a signal to the circuit board 150. The light-emitting body 140 is electrically connected to the circuit board 150 so that the light-emitting body 140 can be controlled to emit light or not emit light by the circuit board 150.

The connection assembly 200 includes an electrical connection module 210 and an engaging module 220. The electrical connection module 210 is configured to be plugged in and cooperate with the female connectors 130 of two light modules 100 to implement the electrical connection between the two light modules 100. The engaging module 220 is configured to engage with the housings 110 of two light modules 100 so that the housings 110 of the two light modules 100 can be engaged through the engaging module 220. The arrangement of the connection assembly 200 achieves the electrical connection and engaging between light modules 100. The connection assembly 200 has rich functions.

For the lighting effect module provided by the embodiment, a female connector 130 is disposed on the housing 110 of a light module 100, and an electrical connection module 210 of the connection assembly 200 is configured to be plugged in and cooperate with the female connector 130 to implement the electrical connection between two light modules 100 that need to be spliced; the connection assembly 200 also includes an engaging module 220 configured to engage with the housings 110 of two light modules 100 so that the two light modules 100 can also be engaged through the connection assembly 200, and magnets are not required to be installed in the light modules 100, thereby making the overall size of the light modules 100 smaller. The configuration of the engaging module 220 enables the connection between light modules 100 to be achieved simultaneously by the electrical connection module 210 and the engaging module 220, reduces the force borne by the electrical connection module 210, and thus reduces the probability of failure of the electrical connection module 210 and the female connector 130 being plugged. Moreover, the stability of signal transmission is ensured, enabling the lighting effect module to have higher reliability.

Optionally, as shown in FIG. 2, the engaging module 220 includes a connection block 221 and a first engaging piece 222. At least two first engaging pieces 222 are provided, and first engaging pieces 222 are disposed on two sides of the connection block 221. Preferably, the first engaging pieces 222 are disposed on the opposite sides of the connection block 221. Certainly, it can be understood that the first engaging pieces 222 are disposed on two adjacent sides of the connection block 221. A first engaging piece 222 on one side of the connection block 221 is configured to engage with the housing 110 of one light module 100, and a first engaging piece 222 on another side of the connection block 221 is configured to engage with the housing 110 of another light module 100. Illustratively, an engaging hole 111 is disposed on the housing 110, and the first engaging piece 222 can be inserted into the engaging hole 111 and engage and cooperate with the engaging hole 111. Optionally, the engaging hole 111 is disposed on the sidewall of the housing 110 to facilitate the insertion of the first engaging piece 222. Certainly, it can be understood that the engaging hole 111 may also be disposed on the bottom wall of the housing 110, which is not limited by this embodiment.

Figure 5:
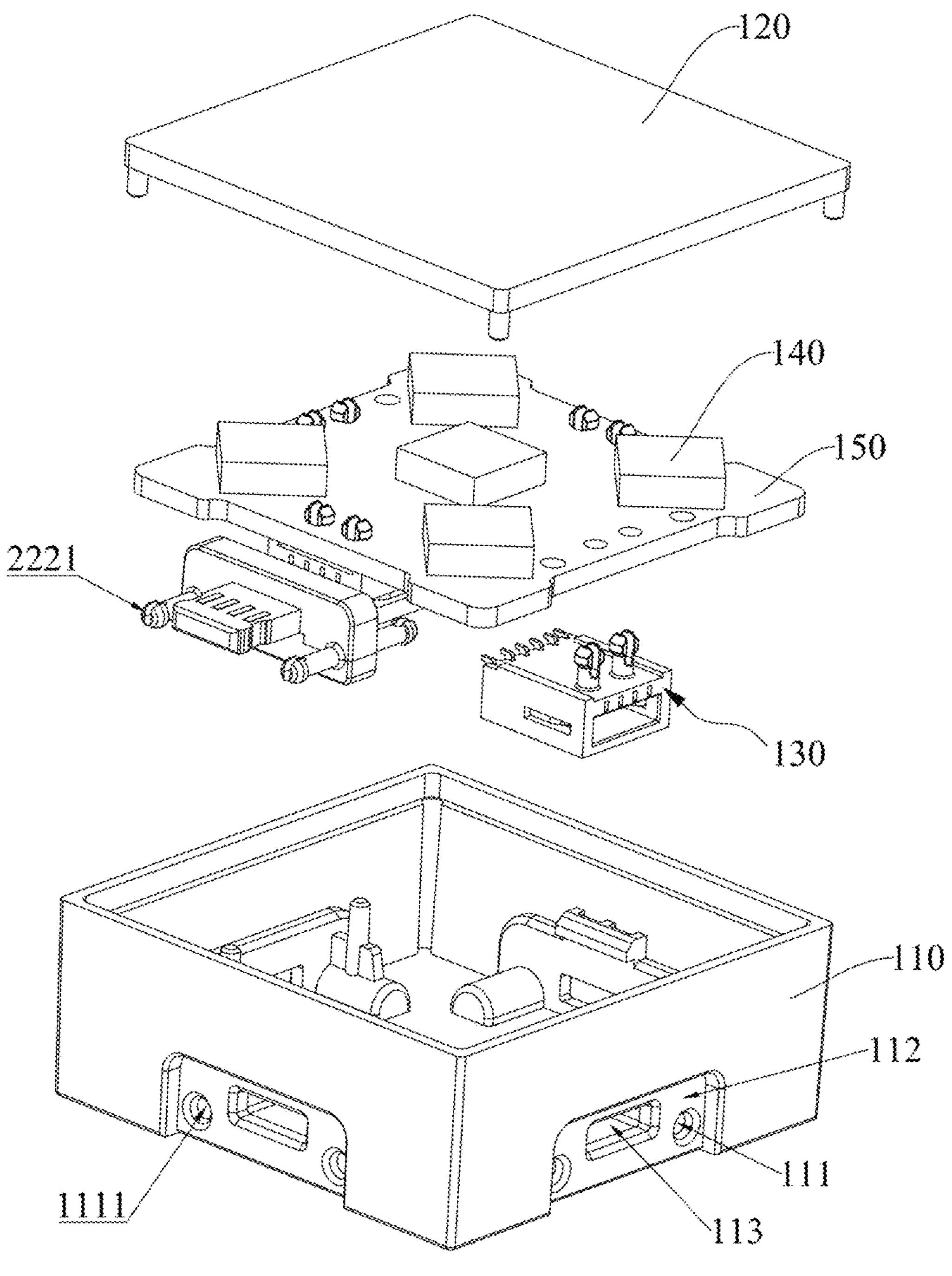
FIG. 5 is an exploded view two illustrating the structure of a light module according to an embodiment of the present application.
Figure 6:
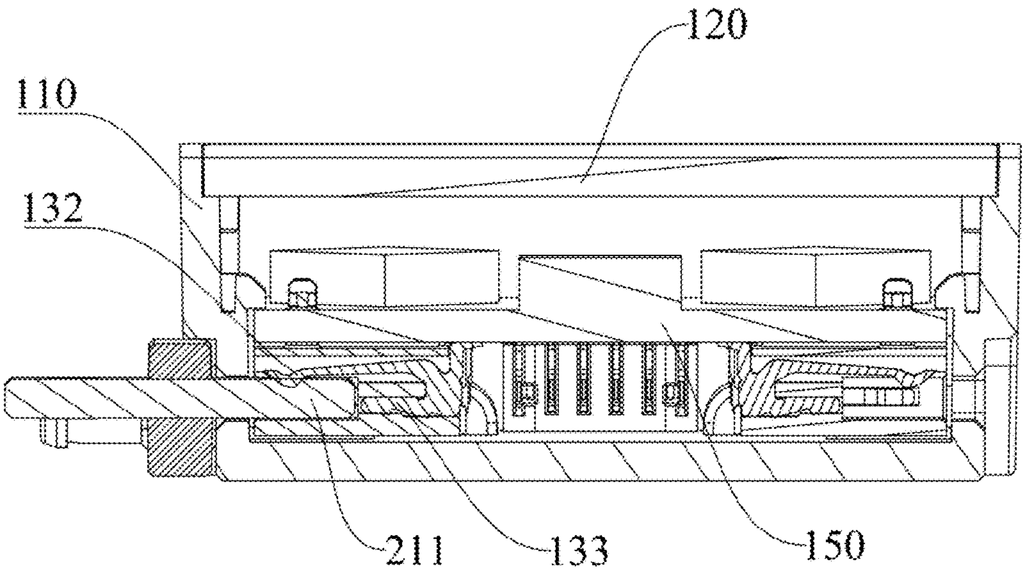
FIG. 6 is a sectional view two of a light module according to an embodiment of the present application.
Figure 7:
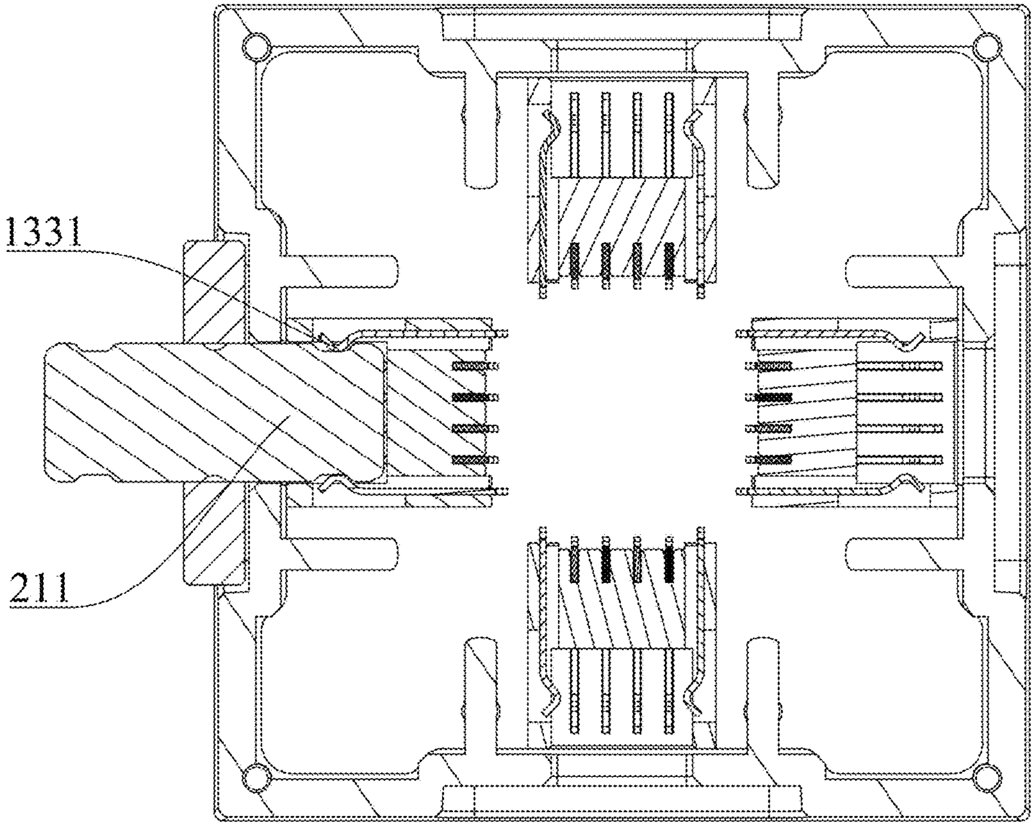
FIG. 7 is a sectional view three of a light module according to an embodiment of the present application.

In some optional embodiments, as shown in FIG. 5, two blocks 2221 arranged opposite to each other are disposed at an end of the first engaging piece 222, and a gap exists between the two blocks 2221 so that the two blocks 2221 can elastically deform. That is, the two blocks 2221 can be close to each other under an external force, and when the external force disappears, the two blocks 2221 can return to the original state.

Figure 4:
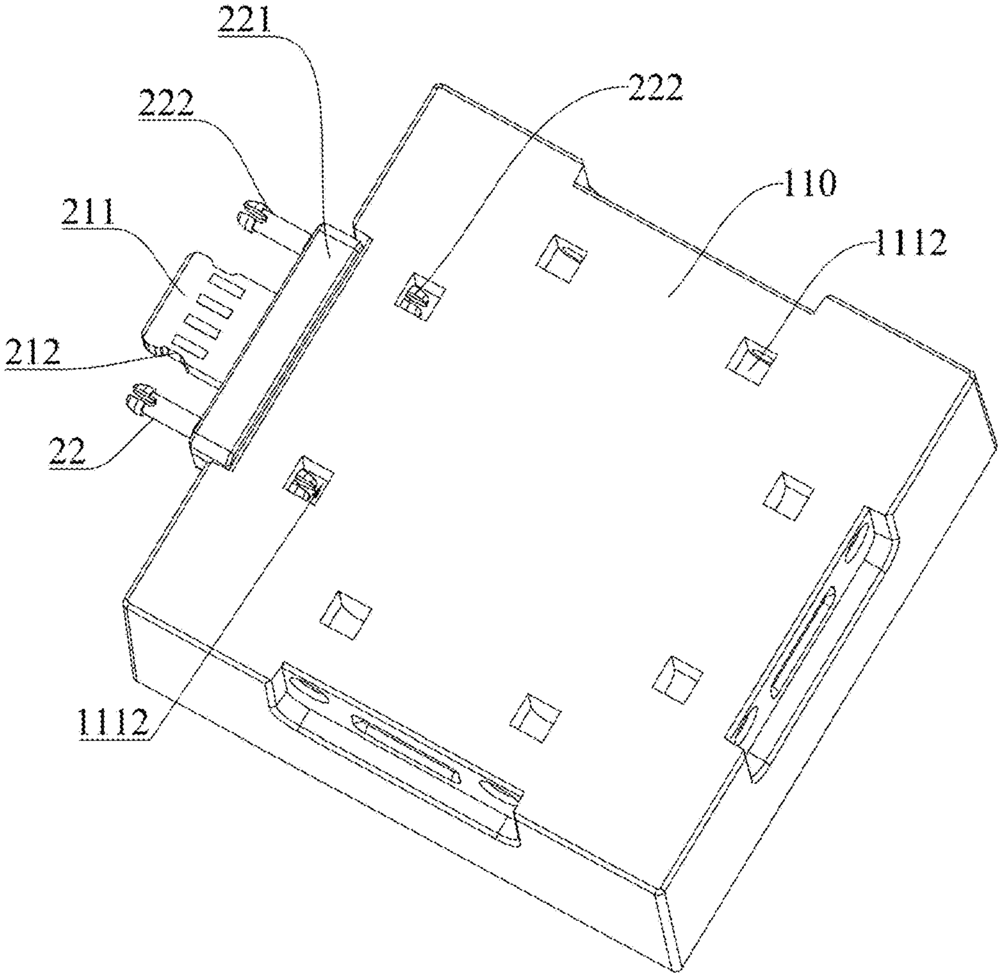
FIG. 4 is a view two illustrating the structure of a light module according to an embodiment of the present application.

As shown in FIG. 4 and FIG. 5, the engaging hole 111 in this embodiment includes a small hole section 1111 and a large hole section 1112. In the case where the engaging hole 111 is disposed in the sidewall of the housing 110, the small hole section 1111 is closer to the sidewall of the housing 110 than the large hole section 1112. The two blocks 2221 need to be deformed when passing through the small hole section 1111, that is, the two blocks 2221 are close to each other under the extrusion of the hole walls of the small hole section 1111. When the two blocks 2221 move to the large hole section 1112, the two blocks 2221 return to their original shape and can be limited in the large hole section 1112, thereby achieving the engaging between the first engaging piece 222 and the housing 110. It should be noted that when the two blocks 2221 are located in the large hole section 1112, and when the first engaging piece 222 is pulled in the axis direction of the engaging hole 111, the end surfaces of the blocks 2221 abut against the housing 110 so that the two blocks 2221 do not enter the small hole section 1111. In this manner, the engaging reliability of the first engaging piece 222 and the housing 110 is ensured.

Optionally, as shown in FIG. 4, the large hole section 1112 extends to the bottom wall of the housing 110 so that a user may use a tool to hold two blocks 2221 close to each other through the large hole section 1112. In this case, when the first engaging piece 222 is pulled outward, the two blocks 2221 can smoothly enter the small hole section 1111, thereby implementing the disassembly of the first engaging piece 222 and the housing 110 and thus facilitating the reassembly of the lighting effect module and the reuse of the connection assembly 200. Thus, relatively high flexibility is provided.

In the embodiment, multiple first engaging pieces 222 are disposed on the opposite sides of the connection block 221 to improve the engaging effect and engaging stability between the engaging module 220 and the housing 110. In the embodiment, as shown in FIG. 2, two first engaging pieces 222 are disposed on each side of the connection block 221, and the two first engaging pieces 222 are disposed at intervals in the length direction of the connection block 221.

In the embodiment, with reference to FIG. 2, a shallow groove 112 is disposed in the housing 110. Specifically, a shallow groove 112 is disposed on the surface of the housing 110 on which the engaging hole 111 is disposed, and the shallow groove 112 is used to limit the connection block 221, thereby further reducing the probability of the connection assembly 200 being shaken and improving the connection reliability between the light module 100 and the connection assembly 200. It should be noted that the shallow groove 112 limits the connection block 221 in the length and width directions of the connection block 221 but does not limit the connection block 221 in the thickness direction of the connection block 221 to facilitate the connection and detachment of the connection assembly 200 and the light module 100. Preferably, the depth of the shallow groove 112 is less than the thickness of connection block 221 to avoid the interference between the housings 110 of the two light modules 100.

Optionally, as shown in FIG. 2, the electrical connection module 210 includes two male connectors 211 that are disposed on the engaging module 220 and electrically connected to each other, so as to implement power transmission. It should be noted that the two male connectors are disposed on the two sides of the connection block 221 on which the first engaging pieces 222 are disposed. That is, one side of the connection block 221 has one male connector 211 and two first engaging pieces 222, and another side of the connection block 221 also has a male connector 211 and two first engaging pieces 222. In the embodiment, the male connector 211 is disposed between two first engaging pieces 222. The male connector 211 can be plugged in and cooperate with the female connector 130 to implement the electrical connection between the male connector 211 and the female connector 130. In the embodiment, the male connector 211 may include a male terminal body and a conductor disposed on the male terminal body, and the conductors of the two male connectors 211 are electrically connected.

In some optional embodiments, the cross section of the housing 110 is quadrilateral so that the volume of the housing 110 can be smaller. In addition, at least one side of the housing 110 is provided with a female connector 130. In the embodiment, all four sidewalls of the housing 110 are provided with a female connector 130 to improve the splicing flexibility of the light module 100. It can be understood that the cross section of the housing 110 may also be polygonal, circular, and elliptical, which is not limited in the embodiment. When the cross section of the housing 110 is circular or oval, two sides of the housing 110 are one part and another part of the side surface of the housing 110.

Optionally, as shown in FIG. 6 to FIG. 13, the female connector 130 includes a seat body 131 and a conductive terminal 132. A slot 1311, a first plug hole 1312, and an auxiliary slot 1313 are opened on the seat body 131. The first plug hole 1312 separately communicates with the slot 1311 and the auxiliary slot 1313. In the embodiment, a through hole 113 is disposed on the sidewall of the housing 110, the through hole 113 communicates with the slot 1311 of the female connector 130, and the male connector 211 passes through the through hole 113 and is inserted into the slot 1311.

The conductive terminal 132 includes a terminal body 1321 and a limiting structure 1322. The terminal body 1321 is inserted through the first plug hole 1312, and one end of the terminal body 1321 has a contact portion 13211 disposed in the slot 1311. The electrical connection module 210 is configured to be inserted into the slot 1311 and electrically connected to the contact portion 13211. The limiting structure 1322 is connected to another end of the terminal body 1321 and is limited in the auxiliary slot 1313. The conductive terminal 132 is electrically connected to the circuit board 150.

As shown in FIG. 6 to FIG. 13, the female connector 130 includes a seat body 131 and a conductive terminal 132. A slot 1311, a first plug hole 1312, and an auxiliary slot 1313 are opened on the seat body 131. Specifically, the slot 1311 is opened on an end surface of one end of the seat body 131 and is configured to be inserted by a male connector 211. The first plug hole 1312 extends from an end surface of another end of the seat body 131 in the length direction of the seat body 131, and the first plug hole 1312 separately communicates with the slot 1311 and the auxiliary slot 1313. The auxiliary slot 1313 is spaced apart from the slot 1311, that is, the two are not directly connected.

The conductive terminal 132 includes a terminal body 1321 and a limiting structure 1322. The terminal body 1321 is inserted through the first plug hole 1312, and one end of the terminal body 1321 has a contact portion 13211 disposed in the slot 1311. The contact portion 13211 is configured to be electrically contacted to the male connector 211. The limiting structure 1322 is connected to another end of the terminal body 1321 and is limited in the auxiliary slot 1313, that is, the limiting structure 1322 and the terminal body 1321 form a U-shaped structure so that the conductive terminal 132 can be sandwiched in the seat body 131 to achieve the fixation of the conductive terminal 132 in the seat body 131.

In the female connector 130 provided in the embodiment, an auxiliary slot 1313 is disposed on the seat body 131; the conductive terminal 132 includes a terminal body 1321 and a limiting structure 1322; the terminal body 1321 is inserted through the first plug hole 1312, and one end of the terminal body 1321 has a contact portion 13211 disposed in the slot 1311; the limiting structure 1322 is connected to another end of the terminal body 1321 and is limited in the auxiliary slot 1313. In this manner, the limitation of the terminal body 1321 in the seat body 131 is indirectly achieved so that when the male connector 211 is inserted into the slot 1311, the terminal body 1321 does not move in the plugging and unplugging direction. Thus, it is ensured that the contact portion 13211 of the terminal body 1321 can be smoothly connected to the male connector 211 so that the assembly and fixation of the conductive terminal 132 on the seat body 131 does not require the contact with an inner insulation block, and the conductive terminal 132 is fixed in the seat body 131 through its own structure. Thus, the overall size of the female connector 130 can be smaller, thereby making the overall size of the light module 100 smaller. Then it is convenient for the light module 100 to be applied in electronic devices with high space requirements.

Figure 8:
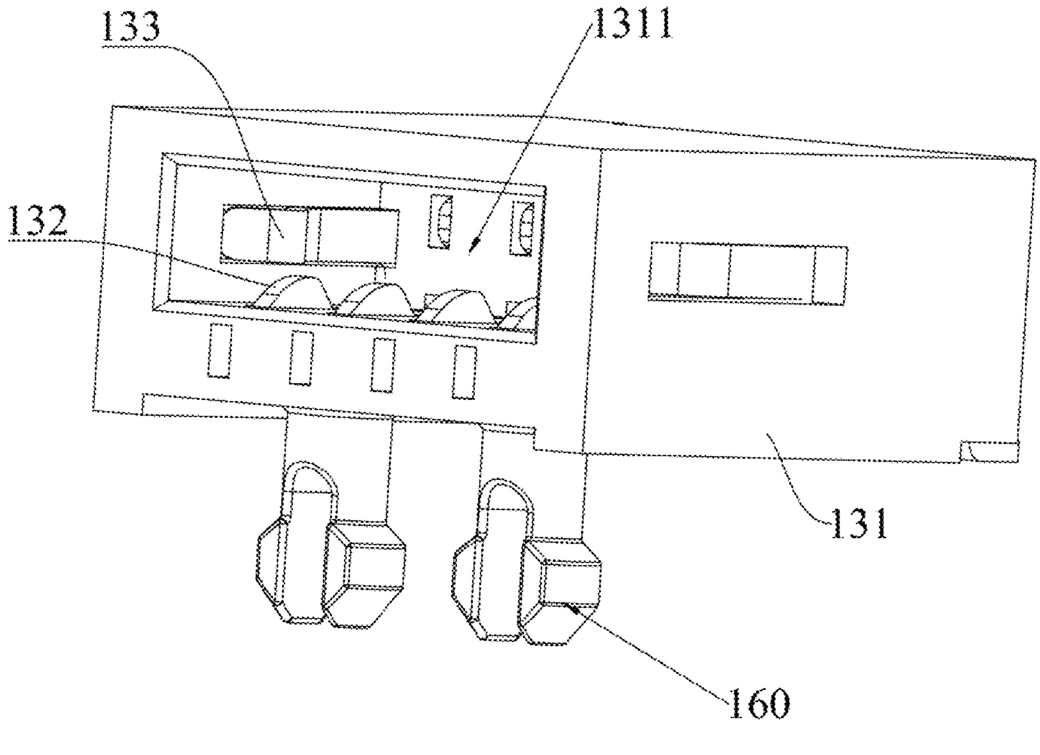
FIG. 8 is a view one illustrating the structure of a female connector according to an embodiment of the present application.
Figure 9:
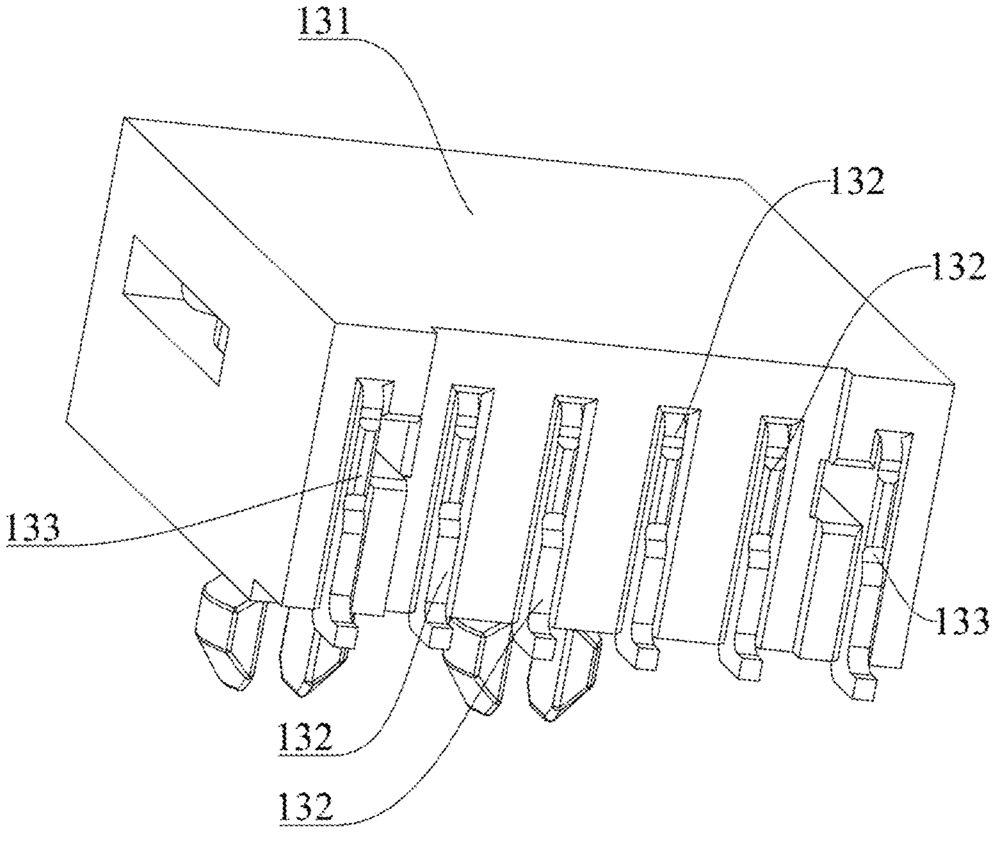
FIG. 9 is a view two illustrating the structure of a female connector according to an embodiment of the present application.
Figure 10:
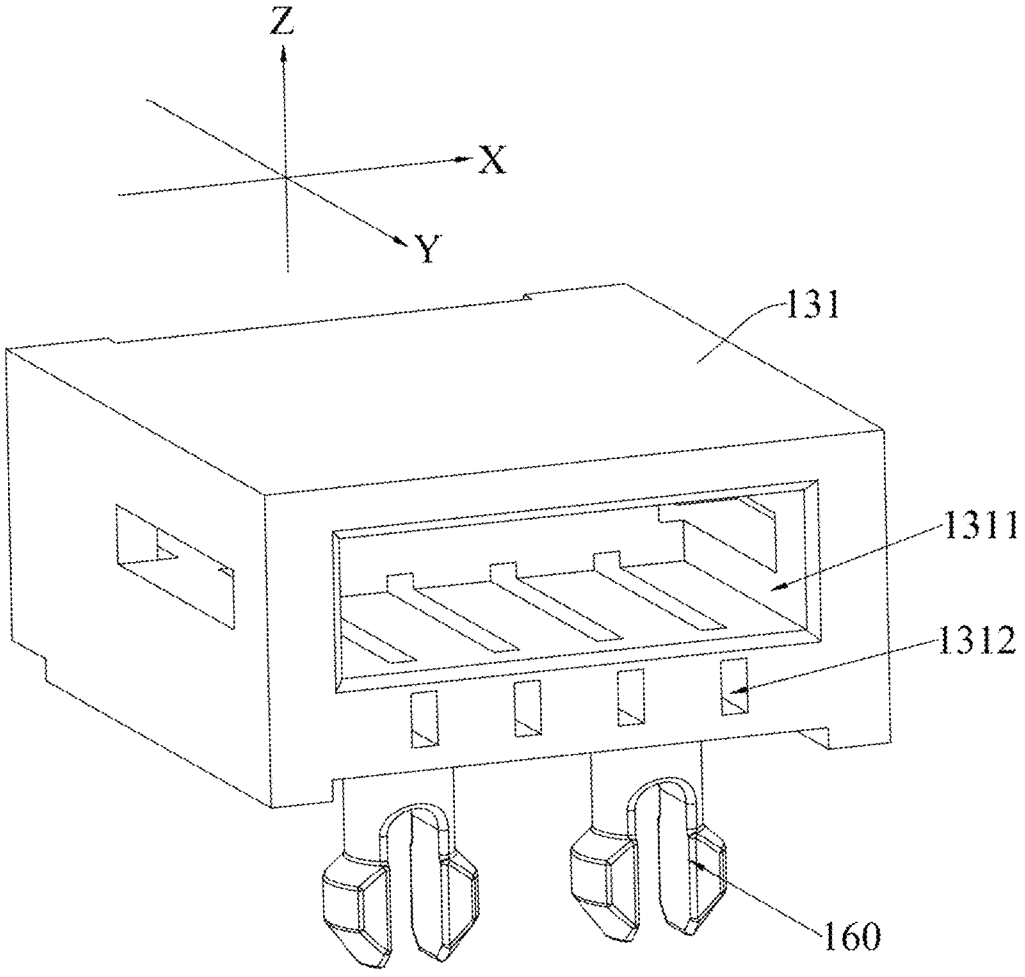
FIG. 10 is a view one illustrating the structure of a seat body according to an embodiment of the present application.
Figure 11:
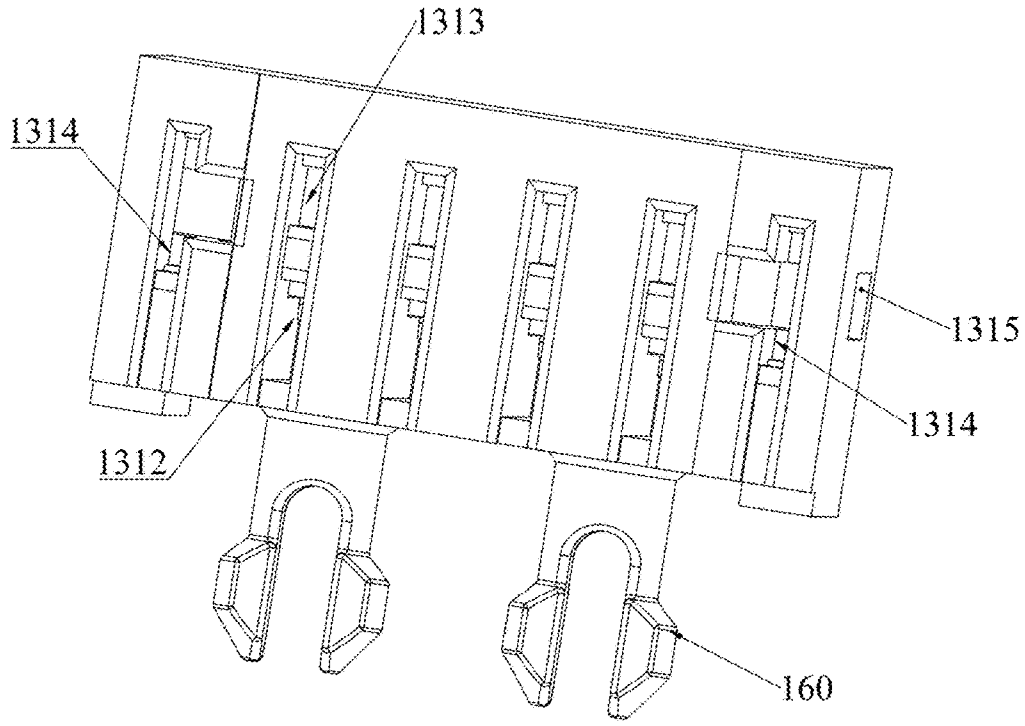
FIG. 11 is a view two illustrating the structure of a seat body according to an embodiment of the present application.

Optionally, as shown in FIG. 8 and FIG. 9, the female connector 130 also includes an engaging holder 133. As shown in FIG. 11, a second plug hole 1314 is also opened on the seat body 131; one end of the engaging holder 133 is limited in the second plug hole 1314 so that the engaging holder 133 does not move in the plugging and unplugging direction; another end of the engaging holder 133 is configured to engage and cooperate with the male connector 211 to improve the stability and reliability of the contact between the female connector 130 and the male connector 211.

Figure 12:
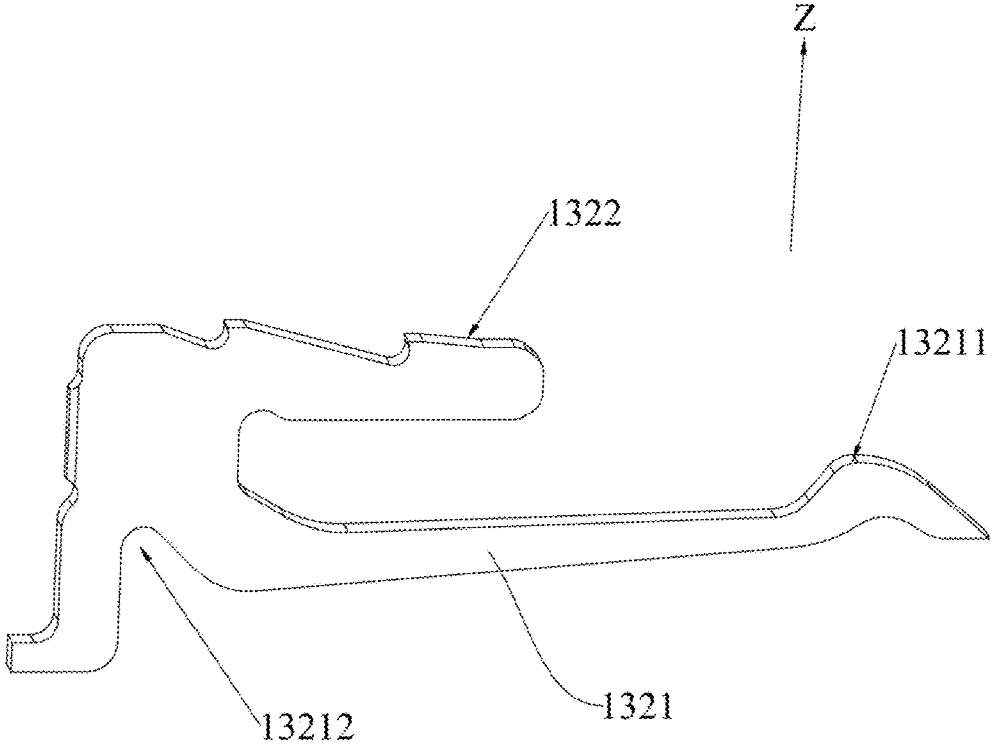
FIG. 12 is a view illustrating the structure of a conductive terminal according to an embodiment of the present application.
Figure 13:
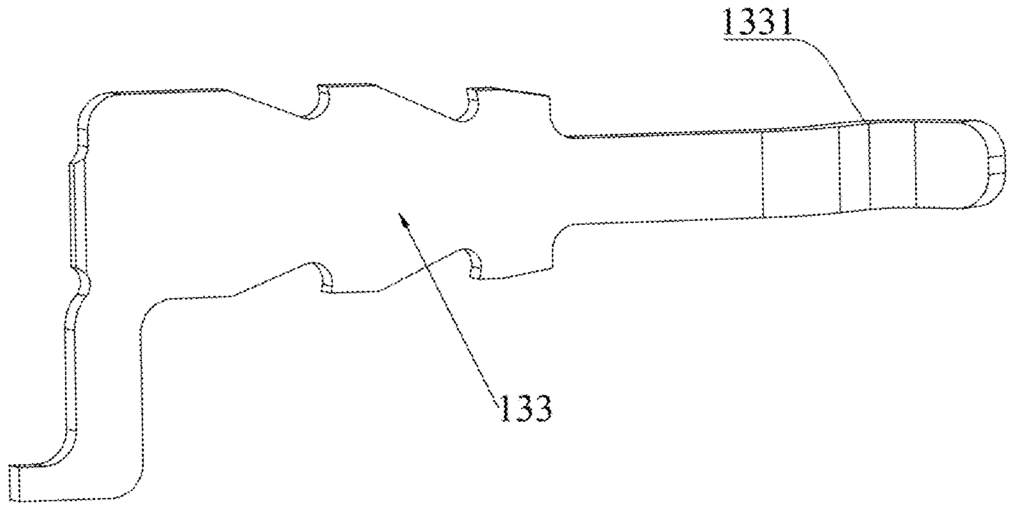
FIG. 13 is a view illustrating the structure of an engaging holder according to an embodiment of the present application.

Illustratively, as shown in FIG. 12, an engaging protrusion 1331 is disposed on another end of the engaging holder 133, a clamping groove 212 is disposed on the electrical connection module 210, and the another end of the engaging holder 133 engages and cooperate with the clamping groove 212. Specifically, as shown in FIG. 4, a clamping groove 212 is disposed on the male connector 211, and the engaging protrusion 1331 engages and cooperates with the clamping groove 212 so that the male connector 211 can be limited in the plugging and unplugging direction, and thus the male connector 211 can be in stable contact with the contact portion 13211.

In some optional embodiments, the engaging holder 133 is a ground terminal. That is, when an electronic product has a high current, the engaging holder 133 may be used as a power ground terminal so that the female connector 130 can be used to transmit large currents, which further improves the applicable scope of the female connector 130 and the light module 100 using the female connector 130. Illustratively, the engaging holder 133 is made of copper alloy to have greater signal transmission capability.

Optionally, two engaging holders 133 and two second plug holes 1314 are provided in a one-to-one correspondence, the two engaging holders 133 are disposed opposite to each other in a first direction X, and one end of each engaging holder 133 is limited in the second plug hole 1314 corresponding to the each engaging holder 133. By the configuration of two engaging holders 133, the male connector 211 can be limited and engaged in the first direction X, thereby further improving the stability of the connection between the male connector 211 and the female connector 130. Illustratively, one of the two engaging holders 133 is disposed on one side of the slot 1311 in the first direction X, and the other engaging holder is disposed on another side of the slot 1311 in the first direction X.

Further, optionally, receiving slots 1315 are opened on the opposite sides of the seat body 131 in the first direction X. The receiving slot 1315 extends in the first direction X to communicate with the slot 1311. The two engaging holders 133 are in a one-to-one correspondence with the two receiving slots 1315. The another end of each engaging holder 133 can enter the receiving slot 1315 corresponding to the each engaging holder 133 under the squeeze of the male connector 211 to form a temporary avoidance, thereby facilitating the insertion of the male connector 211. In the embodiment, one end of the engaging holder 133 is fixed, and another end of the engaging holder 133 is movable in the first direction X, that is, the engaging holder 133 can elastically deform to facilitate the engaging and cooperation between the engaging protrusion 1331 and the clamping groove 212.

Optionally, a first barb structure is disposed on a portion of the engaging holder 133 disposed in the second plug hole 1314, and the first barb structure abuts against the hole wall of the second plug hole 1314 to prevent the engaging holder 133 from moving in the plugging and unplugging direction during the plugging and unplugging process of the male connector 211. Thus, the strength of the connection between the engaging holder 133 and the seat body 131 is increased, and the probability of the engaging holder 133 becoming loose is reduced. In the embodiment, the first barb structure is a barb-shaped protrusion bent toward another end of the seat body 131. Illustratively, the first barb structure is a ring protrusion.

In this embodiment, a second barb structure is disposed on the limiting structure 1322, and the second barb structure abuts against the slot wall of the auxiliary slot 1313 to prevent the limiting structure 1322 from moving in the plugging and unplugging direction during the plugging and unplugging process of the male connector 211. Thus, the strength of the connection between the limiting structure 1322 and the seat body 131 is increased, and the probability of the limiting structure 1322 becoming loose is reduced. In the embodiment, the second barb structure is a barb-shaped protrusion bent toward another end of the seat body 131. Illustratively, the second barb structure is disposed on a side of the limiting structure 1322 away from the terminal body 1321.

Optionally, as shown in FIG. 12, a buffer slot 13212 is disposed on one end of the terminal body 1321 connected to the limiting structure 1322. The configuration of the buffer slot 13212 enables the end of the terminal body 1321 disposed with the contact portion 13211 to move in a second direction Z so that the terminal body 1321 can be in elastic contact with the male connector 211, thereby improving the adaptation capability and contact stability of the conductive terminal 132. The second direction Z is perpendicular to the first direction X. In the embodiment, the first direction X is the width direction of the seat body 131, and the second direction Z is the height direction of the seat body 131.

Optionally, as shown in FIG. 9, multiple conductive terminals 132 and one slot 1311 are provided, multiple first plug holes 1312 and auxiliary slots 1313 are provided in a one-to-one correspondence, and contact portions 13211 at one end of multiple terminal bodies 1321 are all disposed in the slot 1311 to be in electrical contact with the male connector 211 disposed in the slot 1311. Multiple terminal bodies 1321 are in a one-to-one correspondence with multiple first plug holes 1312, and each terminal body 1321 is inserted through a corresponding first plug hole 1312 so that the multiple terminal bodies 1321 can be independent of each other and do not contact each other. Multiple limiting structures 1322 are in a one-to-one correspondence with multiple auxiliary slots 1313, and each limiting structure 1322 is limited in a corresponding auxiliary slot 1313 so that the auxiliary slot 1313 can limit the limiting structure 1322 in each direction, thereby improving the limiting effect of each limiting structure 1322.

Illustratively, the conductive terminal 132 has an integrated structure, that is, the terminal body 1321 and the limiting structure 1322 are integrally formed to have relatively high structural strength. By the configuration of multiple auxiliary slots 1313, the electrical contact between limiting structures 1322 can be avoided, and thus the electrical contact between conductive terminals 132 can be avoided.

Further, optionally, multiple conductive terminals 132 are spaced apart in the first direction X, and the auxiliary slot 1313 and a corresponding first plug hole 1312 are spaced apart in the second direction Z so that the configuration of the auxiliary slot 1313 does not affect the spacing between the conductive terminals 132 and allows the size of the female connector 130 in the first direction X to be smaller.

In the embodiment, the auxiliary slot 1313 is disposed on a side of the slot 1311 in a third direction Y, and the first plug hole 1312 is disposed under the auxiliary slot 1313 so that the space on the seat body 131 can be fully utilized, and the miniaturization of the female connector 130 is facilitated. It should be noted that any two of the first direction X, the second direction Z, and the third direction Y are perpendicular to each other. The third direction Y may be the length direction of the seat body 131.

Optionally, the spacing between two adjacent conductive terminals 132 in the first direction X is 0.8 mm to 2 mm. Illustratively, the spacing between two adjacent conductive terminals 132 in the first direction X is 0.8 mm, 1 mm, 1.5 mm, or 2 mm. Preferably, the spacing between two adjacent conductive terminals 132 in the first direction X is 1 mm.

Optionally, the length of the seat body 131 is 5 cm to 10 cm. Illustratively, the length of the seat body 131 is 5 cm, 6 cm, or 10 cm. Preferably, the length of the seat body 131 is 6.55 cm. It should be noted that the length direction of the seat body 131 is the third direction Y.

The width of the seat body 131 is 5.5 cm to 10 cm. Illustratively, the width of the seat body 131 is 5 cm, 6 cm, or 10 cm. Preferably, the width of the seat body 131 is 6 cm. It should be noted that the width direction of the seat body 131 is the first direction X.

The height of the seat body 131 is 2 cm to 5 cm. Illustratively, the height of the seat body 131 is 5 cm, 6 cm, or 10 cm. Preferably, the height of the seat body 131 is 2.9 cm. It should be noted that the height direction of the seat body 131 is the second direction Z.

In the embodiment, the height of the slot 1311 is 1 cm to 2 cm. Preferably, the height of the slot 1311 is 1.3 cm. The height of the slot 1311 is 4 cm to 6 cm. Preferably, the height of the slot 1311 is 4.5 cm.

In some embodiments, as shown in FIG. 8, a second engaging piece 160 is disposed at the bottom of the seat body 131, and the second engaging piece 160 engages and cooperates with the circuit board 150 so that the female connector 130 can better contact the contact point on the circuit board 150. Illustratively, the circuit board 150 is provided with a hole, and the second engaging piece 160 passes through the hole and engages with the circuit board 150. In this embodiment, the specific structure of the second engaging piece 160 is the same as that of the first engaging piece 222. When entering the hole, two blocks 2221 of the second engaging piece 160 are squeezed by the hole wall and then approach each other.

In this embodiment, a contact point is disposed on the circuit board 150, the conductive terminal 132 has a first connection end disposed outside the seat body 131, and the first connection end is electrically connected to the contact point on the circuit board 150. The engaging holder 133 has a second connection end disposed outside the seat body 131. The second connection end is electrically connected to another contact point on the circuit board 150.

The embodiment also provides a light, including the preceding light module.

Multiple light modules 100 and connection assemblies 200 are provided. Two light modules 100 are electrically connected and engaged by a connection assembly 200. The light provided by the embodiment has relatively high flexibility and connection reliability and reduces the probability of connection failure.

It is to be noted that the preceding are only preferred embodiments of the present application and technical principles used therein. It is to be understood by those skilled in the art that the present application is not limited to the embodiments described herein. Those skilled in the art can make various apparent modifications, adaptations, and substitutions without departing from the scope of the present application. Therefore, while the present application is described in detail through the preceding embodiments, the present application is not limited to the preceding embodiments and may include more other equivalent embodiments without departing from the concept of the present application. The scope of the present application is determined by the scope of the appended claims.

What is claimed is:

1. A lighting effect module, comprising:

a light module, wherein the light module comprises a housing, a light cover, a female connector, a light-emitting body, and a circuit board, the light cover and the female connector are each disposed on the housing, the light-emitting body and the circuit board are each disposed in the housing, and the light-emitting body and the female connector are electrically connected to the circuit board; and a connection assembly, wherein the connection assembly comprises an electrical connection module and an engaging module, the electrical connection module is configured to be plugged into and cooperate with female connectors of two light modules, and the engaging module is configured to engage with housings of the two light modules to enable the two light modules to be electrically connected and engaged through the connection assembly;

wherein the female connector comprises:

a seat body formed with a slot, a first plug hole, and an auxiliary slot, and the first plug hole separately communicates with the slot and the auxiliary slot and a conductive terminal comprising a terminal body and a limiting structure, wherein the terminal body is inserted through the first plug hole, and one end of the terminal body has a contact portion disposed in the slot, the electrical connection module is configured to be plugged into the slot and electrically connected to the contact portion, another end of the terminal body is connected to the limiting structure limited in the auxiliary slot, and the conductive terminal is electrically connected to the circuit board.

2. The lighting effect module of claim 1, wherein, the engaging module comprises a connection block and a plurality of first engaging pieces disposed on two sides of the connection block; the housing is provided with an engaging hole, and a first engaging piece of the plurality of first engaging pieces disposed at one side of the connection block is configured to engage and cooperate with the engaging hole.

3. The lighting effect module of claim 2, wherein the plurality of first engaging pieces are disposed on opposite sides of the connection block.

4. The lighting effect module of claim 3, wherein the electrical connection module comprises two male connectors disposed on the engaging module and electrically connected to each other, and a male connector of the two male connectors is configured to be plugged in and cooperate with the female connector.

5. The lighting effect module of claim 3, wherein a second engaging piece is disposed on the female connector and is configured to engage and cooperate with the circuit board.

6. The lighting effect module of claim 3, wherein a cross section of the housing is quadrilateral, and each of at least one sidewall of the housing is provided with the female connector.

7. The lighting effect module of claim 2, wherein a shallow groove is disposed on the housing and is configured to limit the connection block.

8. The lighting effect module of claim 7, wherein the electrical connection module comprises two male connectors disposed on the engaging module and electrically connected to each other, and a male connector of the two male connectors is configured to be plugged in and cooperate with the female connector.

9. The lighting effect module of claim 7, wherein a second engaging piece is disposed on the female connector and is configured to engage and cooperate with the circuit board.

10. The lighting effect module of claim 2, wherein the electrical connection module comprises two male connectors disposed on the engaging module and electrically connected to each other, and a male connector of the two male connectors is configured to be plugged in and cooperate with the female connector.

11. The lighting effect module of claim 2, wherein a second engaging piece is disposed on the female connector and is configured to engage and cooperate with the circuit board.

12. The lighting effect module of claim 2, wherein a cross section of the housing is quadrilateral, and each of at least one sidewall of the housing is provided with the female connector.

13. The lighting effect module of claim 1, wherein the electrical connection module comprises two male connectors disposed on the engaging module and electrically connected to each other, and a male connector of the two male connectors is configured to be plugged in and cooperate with the female connector.

14. The lighting effect module of claim 1, wherein the female connector further comprises an engaging holder, the seat body is further formed with a second plug hole, and the electrical connection module is formed with a clamping groove, wherein one end of the engaging holder is configured to be limited in the second plug hole and another end of the engaging holder is configured to engage and cooperate with the clamping groove.

15. The lighting effect module of claim 1, wherein a cross section of the housing is quadrilateral, and each of at least one sidewall of the housing is provided with the female connector.

16. A light, comprising at least one lighting effect module, wherein each of the at least one lighting effect module comprise:

a light module, wherein the light module comprises a housing, a light cover, a female connector, a light-emitting body, and a circuit board, the light cover and the female connector are each disposed on the housing, the light-emitting body and the circuit board are each disposed in the housing, and the light-emitting body and the female connector are electrically connected to the circuit board; and a connection assembly, wherein the connection assembly comprises an electrical connection module and an engaging module, the electrical connection module is configured to be plugged into and cooperate with female connectors of two light modules, and the engaging module is configured to engage with housings of the two light modules to enable the two light modules to be electrically connected and engaged through the connection assembly;

wherein the female connector comprises:

a seat body formed with a slot, a first plug hole, and an auxiliary slot, and the first plug hole separately communicates with the slot and the auxiliary slot and a conductive terminal comprising a terminal body and a limiting structure, wherein the terminal body is inserted through the first plug hole, and one end of the terminal body has a contact portion disposed in the slot, the electrical connection module is configured to be plugged into the slot and electrically connected to the contact portion, another end of the terminal body is connected to the limiting structure limited in the auxiliary slot, and the conductive terminal is electrically connected to the circuit board.

* * * * *